US010129072B1

(12) United States Patent
Field et al.

(10) Patent No.: US 10,129,072 B1
(45) Date of Patent: Nov. 13, 2018

(54) DISTRIBUTED SECURITY INFORMATION AND EVENT MANAGEMENT SYSTEM WITH APPLICATION-INJECTED REMOTE COMPONENTS

(75) Inventors: John P. Field, Chatham, NJ (US); Robert M. Polansky, Westwood, MA (US); Vijay Ganti, Lexington, MA (US); Stephen Graham, Chapel Hill, NC (US)

(73) Assignee: EMC IP Holding Company LLC, Hopkinton, MA (US)

(*) Notice: Subject to any disclaimer, the term of this patent is extended or adjusted under 35 U.S.C. 154(b) by 1138 days.

(21) Appl. No.: 12/982,288

(22) Filed: Dec. 30, 2010

(51) Int. Cl.
*H04L 12/24* (2006.01)
*H04L 29/08* (2006.01)

(52) U.S. Cl.
CPC .......... *H04L 41/0213* (2013.01); *H04L 29/08* (2013.01)

(58) Field of Classification Search
CPC .................... H04L 41/0213; H04L 29/08072; H04L 29/09
USPC ........................................................ 709/223
See application file for complete search history.

(56) References Cited

U.S. PATENT DOCUMENTS

| 8,117,640 | B1* | 2/2012 | Moriconi et al. | 726/1 |
| 2004/0123293 | A1* | 6/2004 | Johnson | G06F 9/466 718/101 |
| 2007/0277056 | A1* | 11/2007 | Varadarajan | G06F 11/1438 714/15 |
| 2008/0010225 | A1* | 1/2008 | Gonsalves et al. | 706/11 |
| 2008/0162592 | A1* | 7/2008 | Huang et al. | 707/202 |

OTHER PUBLICATIONS

"eXtensible Access Control Markup Language (XACML) Version 3.0," OASIS, Committee Specification 01, Aug. 2010, pp. 1-150.
"RSA enVision® Platform at a Glance," The Security Division of EMC, 3-in-1 Log Management Solution, Product Data Sheet, 2008-2009, 2 pages.
"eXtensible Access Control Markup Language (XACML) Version 1.0," OASIS, Committee Specification, Feb. 2003, pp. 1-132.
"A Brief Introduction to XACML," OASIS Committee Specification, Mar. 2003, 4 pages.

* cited by examiner

*Primary Examiner* — Joseph L Greene
(74) *Attorney, Agent, or Firm* — Ryan, Mason & Lewis, LLP

(57) ABSTRACT

A distributed security information and event management system comprises a centralized portion and a plurality of remote portions, with the remote portions being implemented in respective applications within information technology infrastructure. Each of the remote portions comprises one or more remote components inserted into the corresponding application. At least a subset of the remote components of the remote portion are configured for interaction with one or more corresponding centralized components of the centralized portion of the system. The remote components may each be configured to process one or more specified eXtensible Access Control Markup Language (XACML) Obligations or other constructs.

21 Claims, 7 Drawing Sheets

DISTRIBUTED SECURITY INFORMATION AND EVENT MANAGEMENT SYSTEM WITH APPLICATION-INJECTED REMOTE COMPONENTS

FIELD OF THE INVENTION

The present invention relates generally to the field of information processing, and more particularly to the provision of security information and event management (SIEM) functionality for applications running on distributed virtual infrastructure or other types of information technology infrastructure.

BACKGROUND OF THE INVENTION

A typical conventional SIEM system is fully centralized. The centralized SIEM system collects raw log information from monitored remote applications of an enterprise environment, and uses the collected raw log information to build a comprehensive database of application activity. The system subsequently performs correlations on the data stored in the database to determine, for example, if specified patterns are found.

This conventional centralized approach has a number of significant drawbacks. For example, collecting and indexing raw log information in a centralized location increases latency. Also, many of the desired correlations may not require the complete environment context, and so working in a single large centralized database slows the system performance, as much of the data collected and indexed is not relevant to a particular query. In addition, since there are usually many queries to be correlated, and these are sharing a single database, it is unduly complex to prioritize and otherwise schedule resources for a selected subset of queries that might affect a subset of users or services. These and other problems create serious scalability issues for centralized SIEM systems, and as a result it is becoming increasingly difficult to implement such systems in large-scale public or private clouds or using other types of distributed virtual infrastructure.

Another important drawback of the centralized SIEM approach is loss of application context. Since the log information is transmitted to a single collection point, relevant application context may be lost. For example, the log information may not contain all of the disk or memory program context that existed at the moment the log record was persisted. By its nature, a log record is a very specific, limited summary of something that the application chooses to record. It is not everything that is known to the application when the log was written. More information, such as current power consumption, or the identification of other processes running on the host, may be relevant, but will not be logged natively by the application, and therefore will not be accessible to the centralized SIEM system.

SUMMARY OF THE INVENTION

An illustrative embodiment of the present invention provides an information processing system in which functionality of a security information and event management (SIEM) system is distributed, with remote components of the SIEM system being injected directly into applications running on servers or other types of information technology infrastructure, which may comprise distributed virtual infrastructure.

In one aspect, a distributed SIEM system comprises a centralized portion and a plurality of remote portions, with the remote portions being implemented in respective applications within information technology infrastructure. Each of the remote portions comprises one or more remote components inserted into the corresponding application. At least a subset of the remote components of the remote portion are configured for interaction with one or more corresponding centralized components of the centralized portion of the system. The remote components may each be configured to process one or more specified eXtensible Access Control Markup Language (XACML) Obligations or other constructs.

The illustrative embodiments advantageously overcome one or more of the above-noted drawbacks of conventional centralized SIEM approaches. For example, a distributed SIEM system in one or more of these embodiments reduces latency, improves system throughput performance and scalability, and avoids loss of application context. This considerably facilitates the provision of effective SIEM systems, particularly in large-scale public or private clouds using distributed virtual infrastructure.

These and other features and advantages of the present invention will become more readily apparent from the accompanying drawings and the following detailed description.

DETAILED DESCRIPTION

The present invention will be described herein with reference to exemplary information processing systems and associated servers, computers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
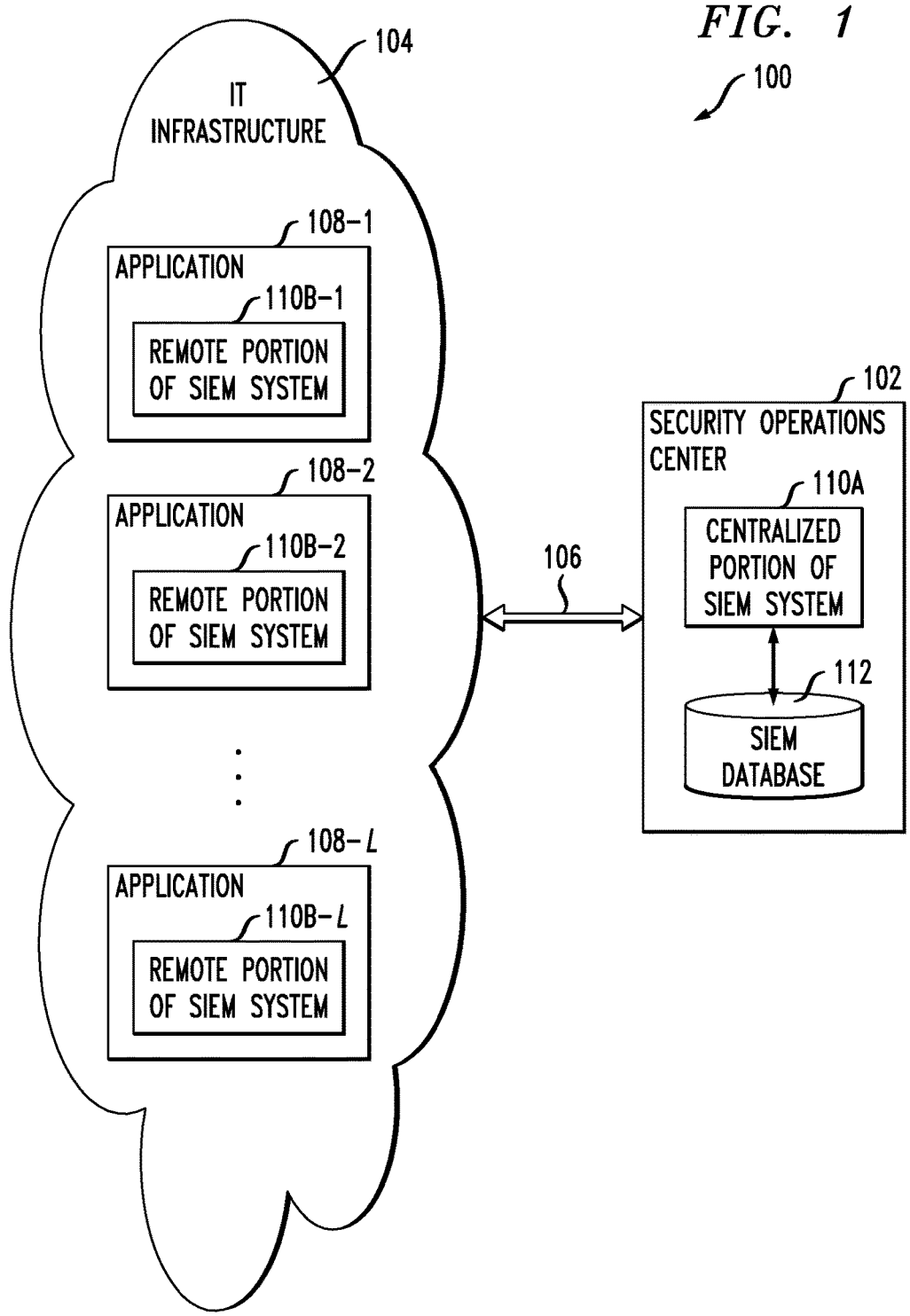
FIG. 1 shows an information processing system that incorporates a distributed security information and event management (SIEM) system in an illustrative embodiment of the invention.

FIG. 1 shows an information processing system 100 configured in accordance with an illustrative embodiment of the invention. The system 100 in this embodiment comprises a security operations center (SOC) 102 coupled to information technology (IT) infrastructure 104 via one or more network connections 106. The SOC 102 generally provides monitoring and control functions for the IT infrastructure 104. The IT infrastructure 104 comprises a plurality of applications 108-1, 108-2, . . . 108-L, each of which may be running on a different server, computer or other processing device. The system 100 further comprises a distributed SIEM system 110 that includes a centralized portion 110A within SOC 102, and a plurality of remote portions 110B-1, 110B-2, . . . 110B-L, each implemented within a corresponding one of the applications 108. The centralized portion 110A of the distributed SIEM 110 is coupled to a SIEM database 112 within the SOC 102.

As will be described in greater detail below, the remote portions 110B comprise injected remote components that are configured for interaction with one or more corresponding centralized components of the centralized portion 110A. The remote components may be used to perform operations such as application-specific correlation operations for the application in which they are injected, as well as many other types of operations.

The remote components may be inserted into otherwise unrelated software code of the applications 108 through the use of one or more Aspect Oriented Programming (AOP) constructs, such as eXtensible Access Control Markup Language (XACML) Obligations, as described in OASIS XACML Version 3.0, Committee Specification 01, xacml-3.0-core-spec-cs-01-en, 10 Aug. 2010, which is incorporated by reference herein. An XACML Obligation is an extension of traditional authorization mechanisms, providing an opportunity for a deployment engineer to augment the security of an application with additional code that must be executed in conjunction with an application request as a condition of allowing that application request to be performed. An Obligation can be very specific to details of an application without modifying the underlying application code.

Such XACML Obligations may be used, for example, to specify one or more particular conditions under which designated types of information locally accessible to a given one of the applications 108 are to be reported or otherwise delivered from its remote portion 110B of the SIEM system to the centralized portion 110A of the SIEM system. More generally, at least one of the XACML Obligations may specify one or more particular conditions under which designated types of information locally accessible to the application are to be correlated, reported, delivered or otherwise processed by the remote portion. This may involve, for example, performing local correlation of information within the application before delivering results of such correlation to the centralized portion. Other types of monitoring functions may also be performed, such as gathering of local statistics. The particular conditions may comprise allowable conditions within the application that would not normally trigger generation of an alert absent specification of those conditions using XACML Obligations.

It should be noted that, although illustrative embodiments utilize AOP constructs such as XACML Obligations, numerous other mechanisms may be used to provide the remote SIEM portions 110B within applications 108. These alternative mechanisms include but are not limited to Spring Framework, Aspect-J and .NET. Other examples include proxy components on a network interface, servlet filters, or other programming hook mechanisms.

The various elements of SOC 102 and IT infrastructure 104 of information processing system 100 may be implemented at least in part using public or private cloud infrastructure, or other distributed virtual infrastructure. Such a distributed virtual infrastructure may comprise, by way of example, a hypervisor platform and associated virtual processing and storage elements. An example of a commercially available hypervisor platform suitable for use in an embodiment of the invention is the VMware® vSphere™ which may include an associated management system such as vCenter™. The distributed virtual infrastructure may further comprise one or more distributed processing platforms that include hardware products such as Celerra® and CLARiiON®, both commercially available from EMC Corporation of Hopkinton, Mass.

It is to be appreciated that the particular arrangement of elements shown in FIG. 1 is presented by way of illustrative example only, and in other embodiments different arrangements of additional or alternative elements may be used. Moreover, the functionalities associated with separate elements in the FIG. 1 embodiment may be combined into a lesser number of elements each of which performs multiple functions. Thus, at least a subset of the elements may be collectively implemented on a common processing platform, or each such element may be implemented on a separate processing platform comprising one or more servers, computers or other processing devices. For example, the SOC 102 and applications 108 may each run on a separate processing platform, or portions of the applications 108 or SOC elements such as centralized portion 110A may run on the same platform.

Figure 2:
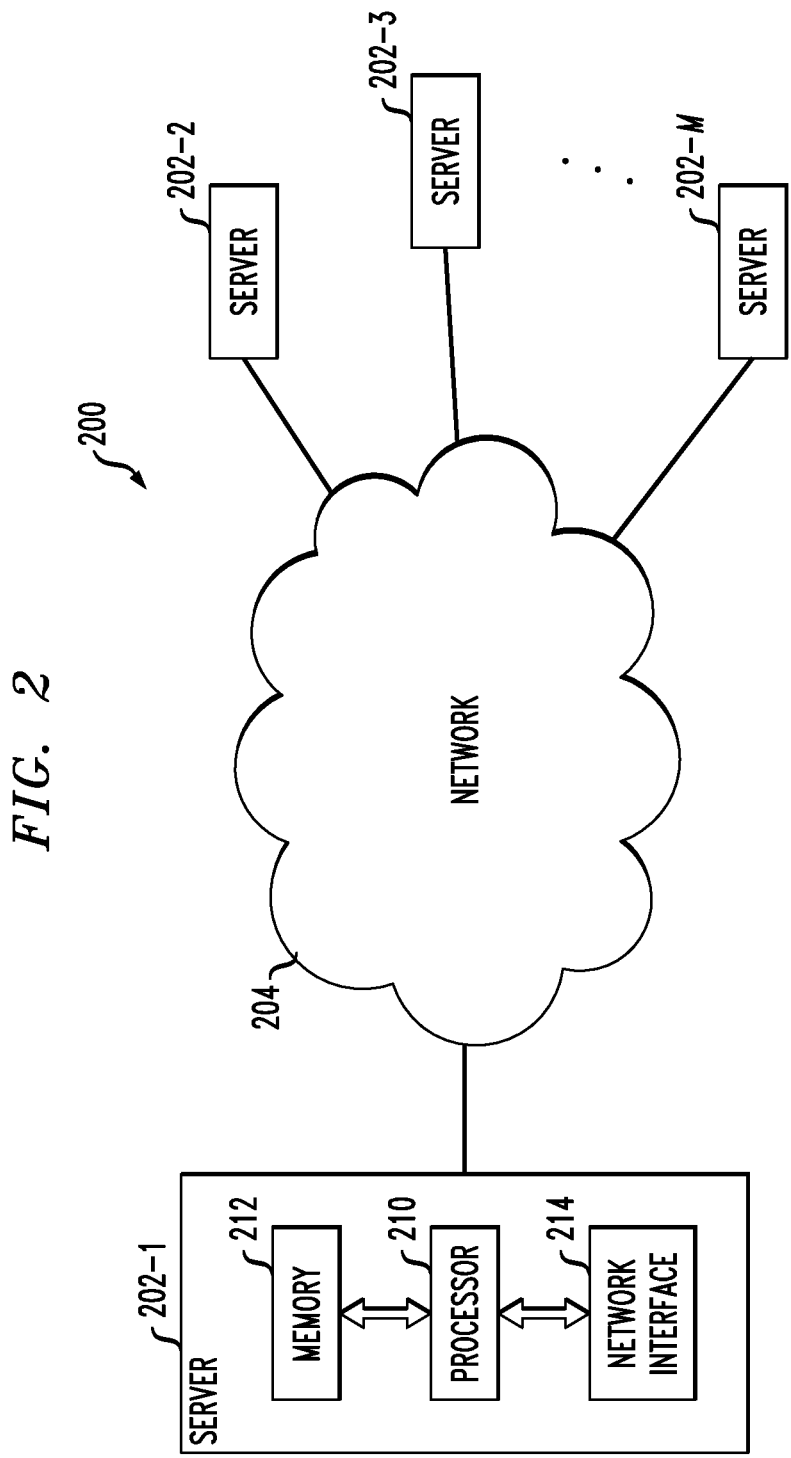
FIG. 2 is a block diagram of an exemplary processing platform that may be utilized to implement at least a portion of the FIG. 1 information processing system.

An example of a processing platform that may be used to implement at least a portion of the information processing system 100 is processing platform 200 shown in FIG. 2. The processing platform 200 in this embodiment comprises at least a portion of the system 100 and includes a plurality of servers, denoted 202-1, 202-2, 202-3, . . . 202-M, which communicate with one another over a network 204. One or more of the elements within SOC 102 or IT infrastructure 104 of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of the information processing system 100. Again, multiple elements may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product" having executable computer program code embodied therein. Such a memory may comprise electronic memory such as random access memory (RAM), read-only memory (ROM) or other types of memory, in any combination. The computer program code when executed by a processing device such as the server 202-1 causes the device to perform functions associated with one or more of the elements of SOC 102 or IT infrastructure 104, or portions thereof. One skilled in the art would be readily able to implement such software given the teachings provided herein. Other examples of computer program products embodying aspects of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, etc. Again, the particular processing platform shown in the figure is presented by way of example only, and system 100 may include additional or alternative processing platforms, as well as numerous distinct processing platforms in any combination.

It should be understood that a given embodiment of the system 100 may include multiple instances of the elements 102, 104 and 106, and other system elements, although only single instances of such elements are shown in the system diagram for clarity and simplicity of illustration.

Also, numerous other arrangements of computers, servers, storage devices or other components are possible in the information processing system 100. Such components can communicate with other elements of the information processing system 100 over any type of network, such as a wide area network (WAN), a local area network (LAN), a satellite network, a telephone or cable network, or various portions or combinations of these and other types of networks.

The operation of the distributed SIEM system 110 will now be described in greater detail with reference to FIGS. 3 through 11.

As indicated previously, conventional centralized SIEM systems have a number of significant drawbacks. The distributed SIEM system 110 overcomes these problems in a way that reduces latency, improves system throughput performance and scalability, and avoids loss of application context. This considerably facilitates the provision of effective SIEM systems, particularly in large-scale public or private clouds using distributed virtual infrastructure. In the distributed SIEM system 110, functionality that in conventional practice would be implemented within the centralized SIEM system is partitioned and distributed out to the applications 108, which helps to reduce the performance and scalability challenges at the centralized SIEM system, while also providing improved results. This is implemented in the present illustrative embodiment by injection of SIEM code directly into the applications 108, such that when a user application transaction is processed, any desired part of the complete context of that request can be made accessible to the SIEM system. This valuable local context would otherwise be lost in a conventional centralized SIEM in which raw log information is collected at a centralized location.

Figure 3:
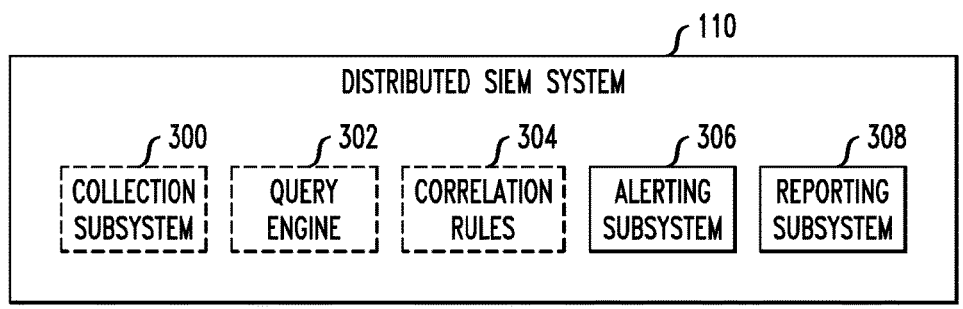
FIG. 3 is a block diagram of one possible embodiment of the distributed SIEM system of FIG. 1.

Referring now to FIG. 3, the distributed SIEM system 110 is shown in more detail. In this embodiment, the SIEM system 110 comprises a collection subsystem 300, a query engine 302, correlation rules 304, an alerting subsystem 306, and a reporting subsystem 308. Other subsystems typically present in a conventional centralized SIEM system may be included but are not specifically shown, such as a visualization subsystem and other components of a commercially available SIEM system such as the enVision® platform from RSA, The Security Division of EMC Corporation.

The parts of the distributed SIEM system 110 that are shown in dashed outline in FIG. 3 are partitioned and at least partially implemented within remote portions 110B. Thus, at least part of the collection subsystem 300, query engine 302 and correlation rules 304 may be implemented in the remote portions 110B of the distributed SIEM system 110, as application-injected remote components. The remaining parts of the distributed SIEM system may be implemented in the centralized portion 110A of the system, within SOC 102. In other embodiments, additional or alternative elements of the distributed system 110 may be partitioned between the remote and centralized portions of the system.

Figure 4:
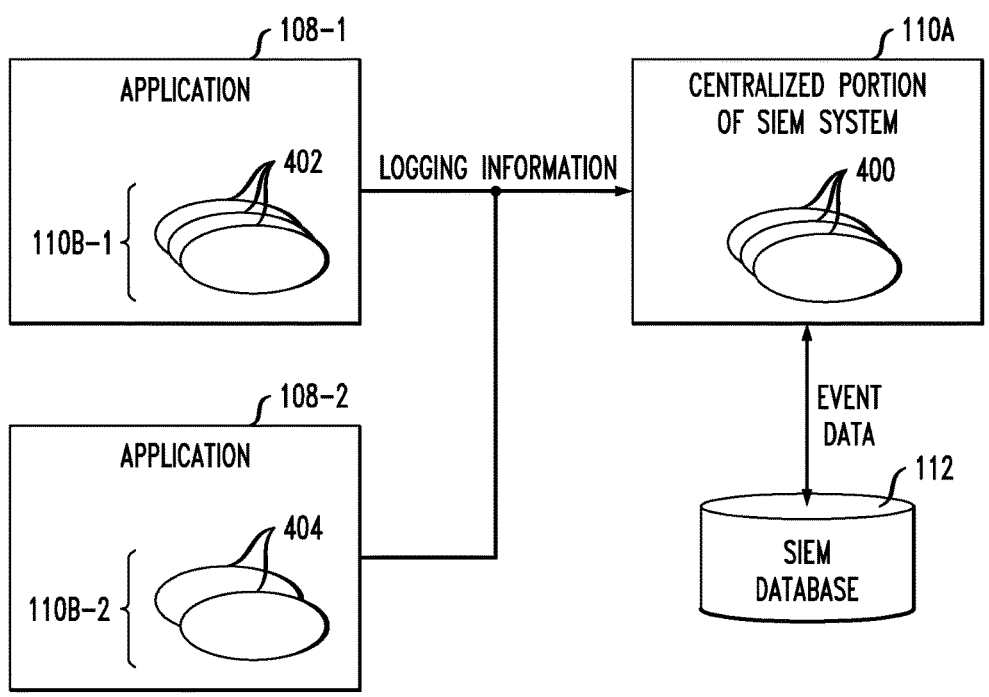
FIG. 4 illustrates the distribution of SIEM components between remote applications and a centralized portion of the SIEM system of FIG. 1.

FIG. 4 shows an exemplary distribution of SIEM components between the remote portions 110B in respective applications 108 and the centralized portion 110A of the system. In this arrangement, certain SIEM components 400 remain centralized within portion 110A, while selected components 402, 404 are injected into applications 108. More specifically, components 402 are injected into application 108-1 to form corresponding remote portion 110B-1, and components 404 are injected into application 108-2 to form corresponding remote portion 110B-2. The components 400 that remain in the centralized portion 110A store event data and other information in SIEM database 112.

It should be noted with regard to FIGS. 3 and 4 that the remote components 402 and 404 typically will not completely replace the corresponding centralized functionality of the SIEM 110. For example, parts of the correlation rules 304 will be distributed in remote components 402 and 404 to the applications 108 and other parts of the correlation rules 304 will remain in the centralized components 400 of centralized portion 110A for performing centralized correlation of events after distributed correlations identify patterns of interest. Each of the correlation components is suited for specific types of correlations, with distributed components allowing greater scale and situational awareness, and centralized components being utilized for correlating across multiple systems and application stacks.

Figure 5:
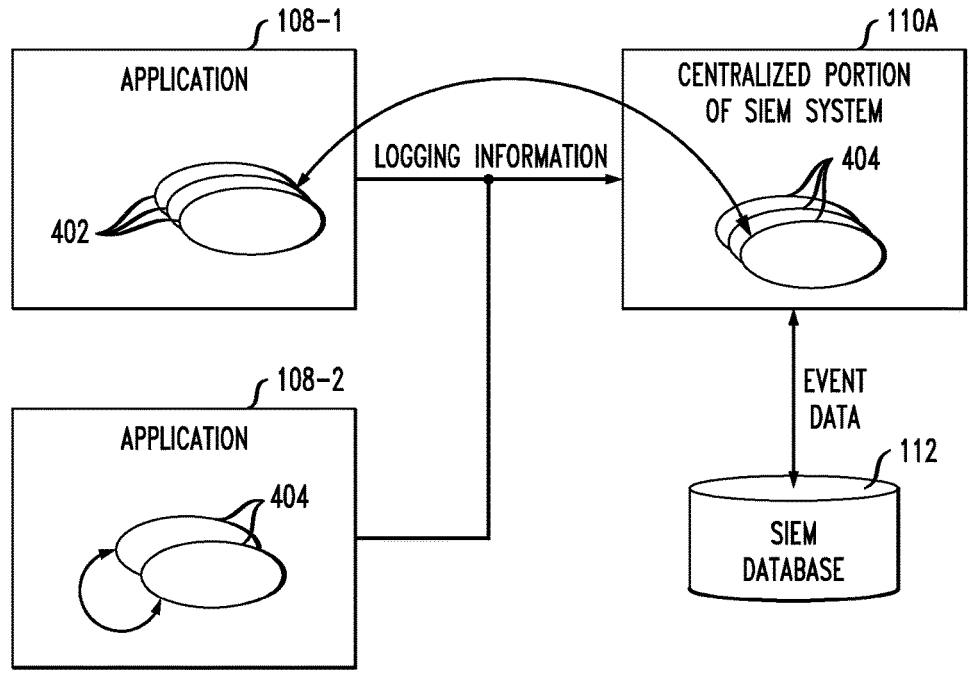
FIG. 5 illustrates exemplary communications between the distributed SIEM components of FIG. 4.

The remote components 402, 404 of the distributed SIEM system 110 are each configured for interaction with one or more of the corresponding centralized components 400 of the centralized portion 110A of the SIEM system. Also, components in one application may be configured for interaction with components in the other application. Examples of both of these types of inter-component interaction are illustrated in FIG. 5. In addition to the inter-component interaction, logging information may be exchanged between the applications 108 and the centralized portion 110A of the SIEM system as shown.

It is also possible for information from the remote components 402, 404 of the distributed SIEM system 110 to be sent to one or more other separate SIEM systems, rather than only to the centralized components of SIEM system 110.

Figure 6:
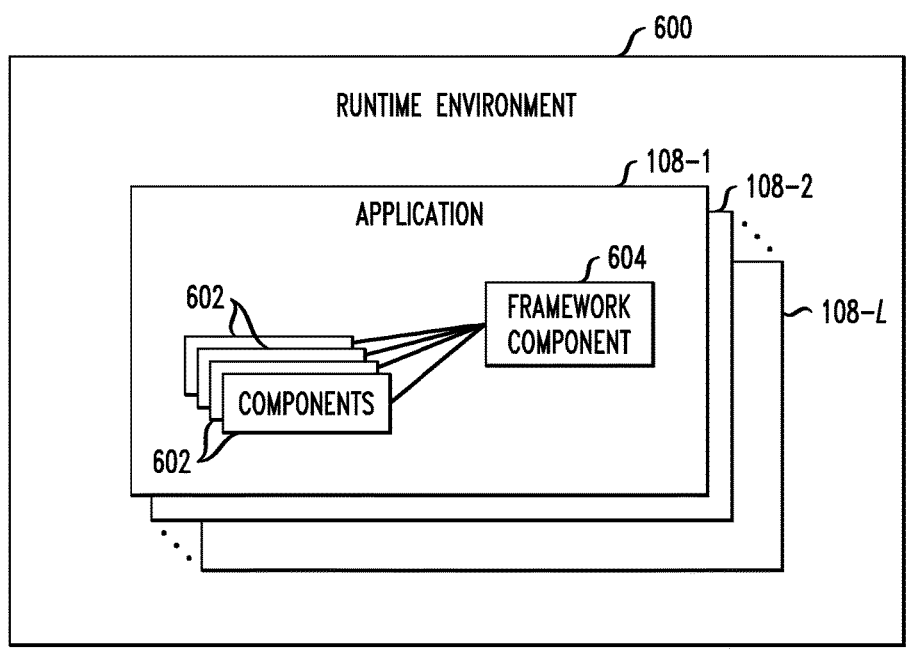
FIG. 6 illustrates the association of applications of the FIG. 1 information processing system with a runtime environment.
Figure 7:
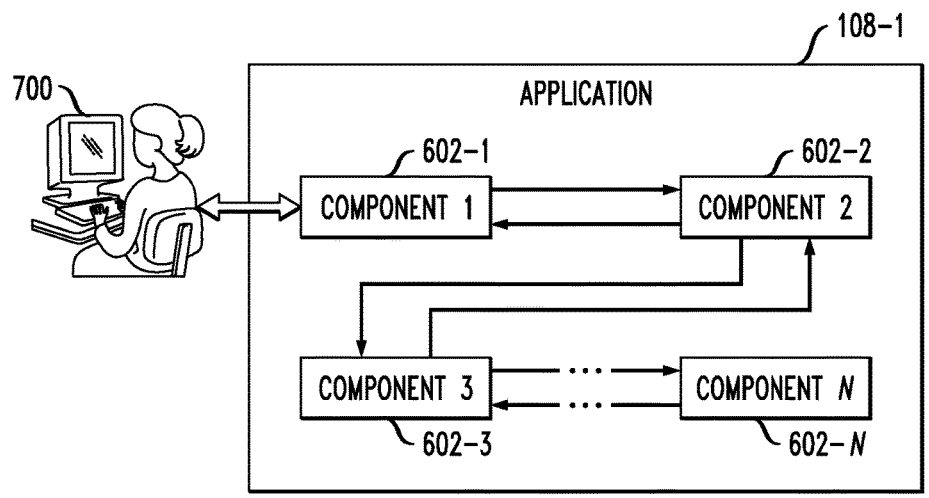
FIG. 7 shows possible interactions between non-SIEM components of a given one of the applications of the FIG. 1 information processing system.

As illustrated in FIG. 6, the applications 108 may be associated with a runtime environment 600. Each of the applications in this embodiment is assumed to comprise a number of non-SIEM internal components 602 that interact with a framework component 604. The framework component 604 scans the other application components 602 and configures them to call each other as appropriate. By way of example, FIG. 7 shows one of the applications 108-1 and its N components 602-1, 602-2, . . . 602-N, illustrating successive invocations of these components in order to satisfy a request from a user 700 at runtime.

Figure 8:
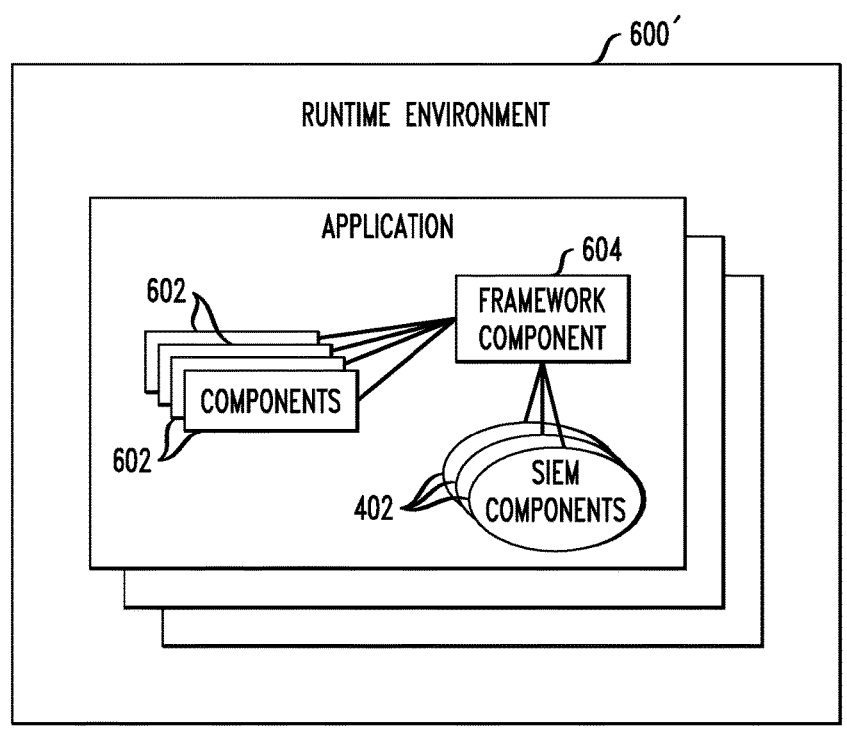
FIG. 8 shows the integration of SIEM components into one of the applications associated with the runtime environment of FIG. 6.

Referring now to FIG. 8, the injection of SIEM remote components 402 into application 108-1 is shown. The runtime environment including the SIEM remote components is designated as 600'. These remote components of the SIEM system interact with framework component 402 as indicated. Each of the other applications 108-2 through 108-L is also assumed to incorporate one or more remote components of the SIEM system, in a manner similar to that shown in FIG. 8 for application 108-1.

Figure 9:
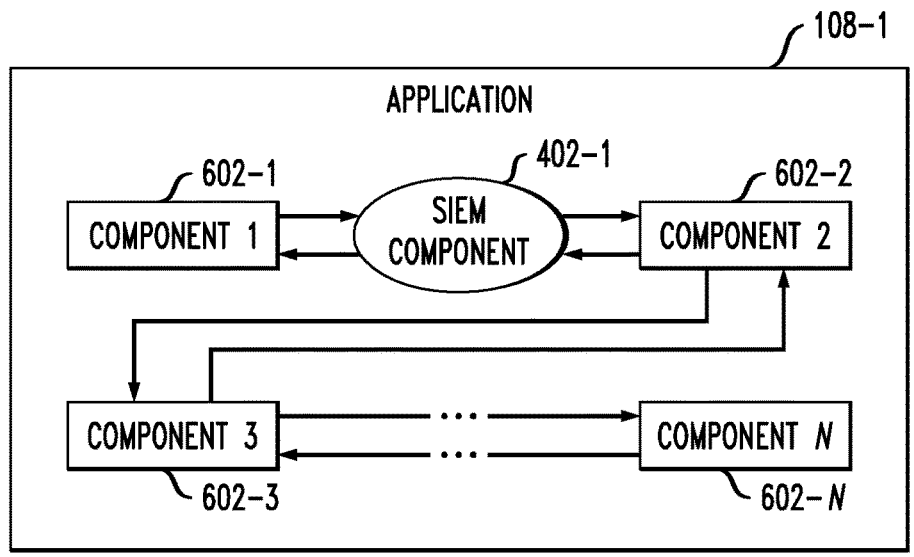
FIGS. 9, 10 and 11 illustrate possible interactions between SIEM components and one or more of the non-SIEM components of the FIG. 7 application.
Figure 10:
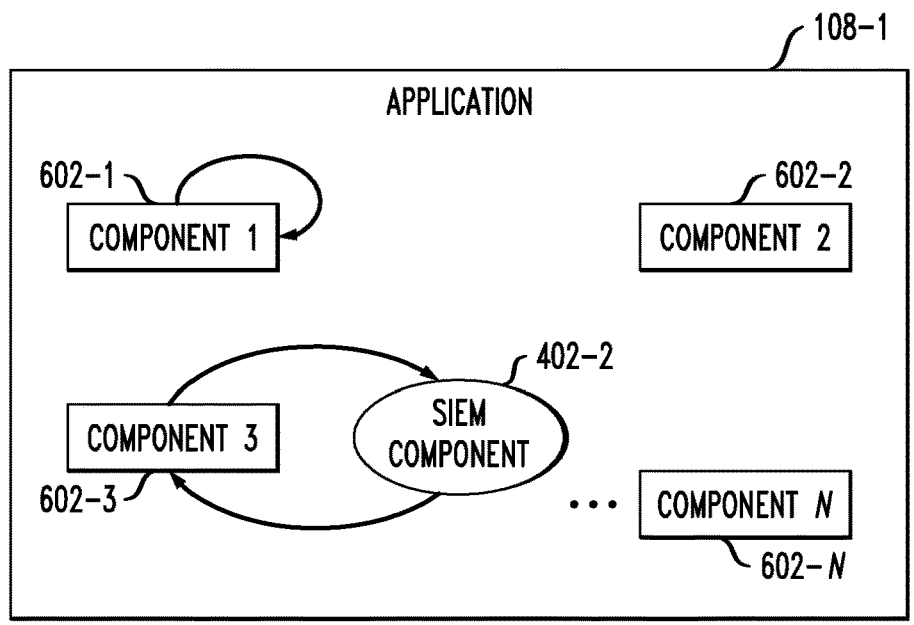
Figure 11:
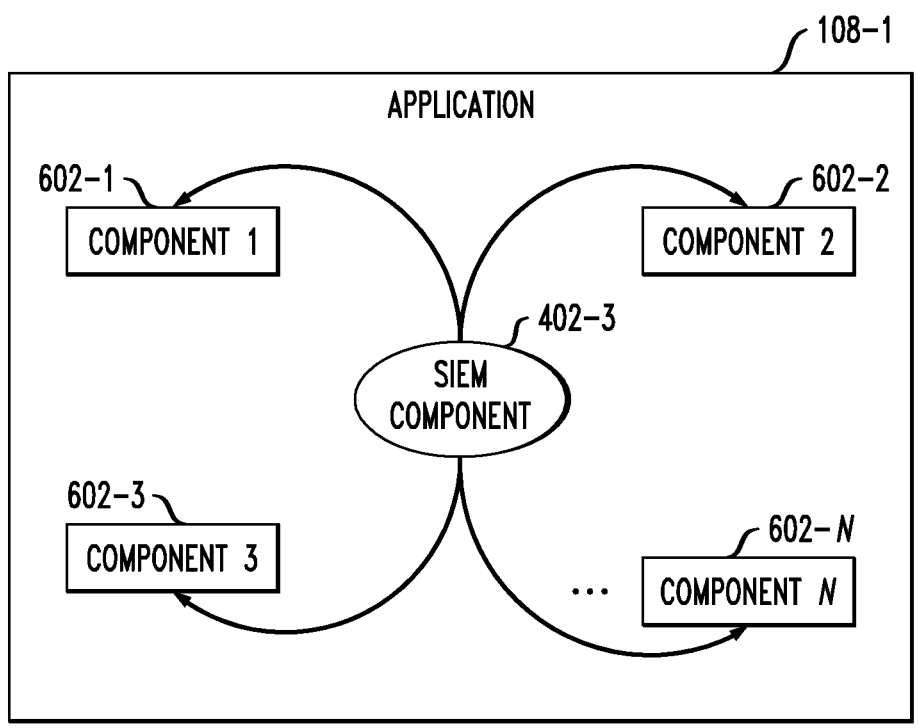

Various different types of interactions between the non-SIEM components and the SIEM remote components within application 108-1 are illustrated in FIGS. 9 through 11. For example, with reference to FIG. 9, an injected SIEM component 402-1 is arranged between components 602-1 and 602-2, which otherwise interact with the other components 602 in the manner previously shown in FIG. 7. An alternative arrangement is shown in FIG. 10, where injected SIEM component 402-2 interacts only with component 602-3 of the application 108-1. Yet another example is shown in FIG. 11, where injected SIEM component 402-3 interacts with each of the N internal components 602 of application 108-1. Of course, these are merely examples, and numerous other types of interaction between one or more remote components of the SIEM system 110 and internal application components may occur in other embodiments.

It should be noted that the particular processing operations and other system functionality described in conjunction with the diagrams of FIGS. 3 through 11 are presented by way of illustrative example only, and should not be construed as limiting the scope of the invention in any way. Alternative embodiments can use other types of processing operations for implementation of a distributed SIEM system.

The manner in which the SIEM remote components 402 and 404 may be injected into the applications 108 will now be described in greater detail. As indicated above, AOP constructs may be used as one possible technique for implementing the SIEM injection. AOP is a programming technique that enables an application developer to add some supplementary program code to an existing application module, without necessarily altering the main flow of the existing program logic (although it could also selectively replace or otherwise alter the flow of the original program if one wanted to do that). The injected supplementary code in the AOP context may be referred to as "advice." This advice can be injected before and/or after a specified point in the original program. One benefit of this and other injection mechanisms is that they provide deeper access to application information (e.g., application-specific domain models and situational awareness) than can be achieved through a centralized SIEM system. However, the use of purely generic AOP has a number of limitations and challenges and in practice this technique alone may not be sufficient in certain cases. Specifically, when attempting to inject the SIEM functionality into an application or its associated device, platform or framework, a design decision must be made as to where in the application program code the SIEM injection(s) should be targeted. In principal this can be done at any arbitrary place in the application. In practice, a lack of consistency regarding insertion points may increase operational costs and can be an impediment to adoption. The use of raw AOP techniques may also imply that the introduction of the SIEM injection can only be accomplished by a software developer who is specifically trained in the use of AOP.

In accordance with an aspect of the invention, the remote SIEM components that implement the SIEM injection(s) may be designed and packaged in a way that allows them to be used with multiple applications. For example, in embodiments of the invention, it is possible to achieve reuse of the SIEM-injection components and also accomplish the SIEM injection on an application without requiring the participation of a specially trained software developer. Instead, it is preferred that the SIEM injection can be achieved through application installation and configuration changes that can be understood and implemented by a person such as a system administrator or an application deployment specialist. This is an important consideration in certain embodiments of the invention because of the number and diversity of applications and devices that must potentially be managed.

The distributed SIEM system 110 addresses the above-described implementation challenges by introducing the SIEM injection in the form of an XACML Obligation, as noted previously. By adopting this approach, the SIEM injection can be readily inserted at a consistent place in the targeted application(s).

The point at which an application does an authorization check represents an opportunity for the injected code to assess the current state of the system, and to inspect the next candidate state of the system. That is, if the function being requested is permitted to be performed, then the overall state of the system will transition from its present state to some new state. An authorization event is therefore an appropriate point in the program execution to perform an SIEM injection, such as performing an SIEM correlation, raising an event or alert, or other function as defined by SIEM policy. However, it should be noted that the injection of SIEM code is not limited to points where the application is actually performing authorization. For example, not all state transitions are points where an application does an authorization check, and in other embodiments SIEM code can be injected at such non-authorization state transition points. SIEM code can also be injected at a variety of other types of appropriate points in a given set of application code.

An implementation based on the use of an Obligation will also allow the application deployer to configure the injected SIEM component as part of a configuration task rather than requiring the AOP developer skills. The SIEM injection can be configured and administered as a standardized module rather than always requiring custom code development by someone who understands the internal application logic.

In summary, using XACML Obligations in the illustrative embodiments has the advantage of encouraging the adoption of a consistent application design pattern and making it possible to leverage an existing security intercept.

However, it is also important to note that the injection techniques disclosed herein are not limited to Obligations, and other techniques such as generic AOP are complementary and are expected to be appropriate in some circumstances. Obligations co-exist with AOP and other techniques, and give the non-developers (e.g., governance, risk management and compliance (GRC) auditor, security administrator, deployment engineer, etc.) a mechanism to achieve aspect-like behavior through pure configuration. As a more particular example, in the specific case of the Spring Framework, the configuration of an SIEM injection may take the form of an Obligation fulfiller bean in the application context configuration file (commonly referred to as the "beans.xml" file).

Specific conditions in the applications 108 can be tracked locally via Obligations injected using AOP aspects or as part of a Spring Security configuration. As indicated above, a given Obligation may embody one or more needed correlation rules. Application-specific logic associated with the Obligation can be fired, by way of example, as a condition of authorizing the access to a resource. The logic may be unique to the application, or more general. An Obligation might be designed to use custom correlation logic, a Complex Event Processor (CEP), or other type of rules engine. The Obligation might be designed to trigger a specific event in the application's security framework, or it might simply compose a log message with the appropriate context to trigger further downstream processing.

The correlation rules, alerts and triggers can still be managed centrally in centralized portion 110A of distributed SIEM system 110 and can be communicated from the remote portions 110B of the SIEM system through any one of a number of conventional mechanisms, including, for example, push, pull, publish and subscribe.

Multiple remote SIEM components can collaborate locally with other elements of the same application 108 that have been replicated for scalability reasons or even loosely coupled. This provides greater locality of intelligence than a fully centralized system. Application execution provides a source of real time metadata for making the overall SIEM system more efficient and effective.

The Obligation code that triggers a deliverable SIEM event may result in one or more output messages being sent to the centralized portion 110A of the SIEM system to propagate a global alert, to establish one or more new correlation rules, to amend an alert definition, etc. These output messages may be out-of-band messages delivered asynchronously with the native application logs. The messages may be considered by the SIEM system to exist on a "data path" or a "control path," or both.

Such an arrangement ensures that the broader deployment is aware of activity that has been noted by an individual application. Among the benefits is the ability to move the computation of correlation closer to where the original application data and logic is located. This gives addressability to that additional context. It also allows the distributed SIEM system to share in the application compute, storage and network capacity, which may be more fluid than the centralized SIEM capacity, particularly in a cloud setting. This improves SIEM system throughput and performance.

An application can also have supplemental policy decisions implemented locally, in a shorter feedback loop, because there is no latency of waiting for response from a central SOC or SIEM. In essence, the application service itself can best help to determine if some activity within that application warrants further attention. Correlation of logs in a central SIEM system, with no involvement of the application and services being watched, will have much more limited fidelity, and less utility.

The distributed SIEM system is therefore more scalable, more responsive and more autonomic than the conventional centralized SIEM system. The distributed SIEM system can narrow the window between initial suspect activity, and the initial SOC response, while at the same time offloading some of the application-specific or routine correlation work from the centralized portion of the SIEM system. This allows the centralized portion of the SIEM system to monitor for activity at a higher level, correlating across a set of richer, application-context aware events. The distributed SIEM system is particularly effective in multi-tenant settings, where there can be cross tenant correlation and/or cross provider correlation.

As noted above, the remote SIEM components injected into the applications 108 may cause designated SIEM operations to occur, such as correlations or generation of alerts, based on locally available context information. Examples of use case scenarios under which performance of SIEM operations based on locally available context information can be particularly beneficial are as follows:

1. A transaction crosses a certain threshold limit. It is otherwise allowed, but is large enough, or small enough, that it is unusual and could be suspect. Or, the transaction is not permitted as per application policies, and will be denied by the application.

2. A user reads or updates a large number of application database records. This is allowed, but unusual.

3. Many different users are logging in and doing the same specific application action, such as transferring funds out of their account. Again, each of these actions is individually allowed, but this activity is unusual.

In each of the above example use case scenarios, the transactions in question are technically allowed within the corresponding applications, but may also be a cause for suspicion or increased vigilance. Scenarios such as these can be addressed by specifying appropriate processing operations within the remote portions 110B of the distributed SIEM system 110, using XACML Obligations or other AOP constructs.

The distributed SIEM system 110 generally provides improved SIEM functionality relative to conventional centralized SIEM systems. Each of the use case scenarios above is an example of an application-specific situation that should raise security concerns, but would not be detected by a conventional centralized SIEM system. For one or more reasons, each of these use cases is an example of a situation or monitoring requirement that is hard to do or impossible to do in a traditional SIEM system, but in fact can be done using a distributed SIEM system configured as described herein.

Advantages of the distributed SIEM system 110 over a conventional centralized SIEM system include access to application-specific domain models, situational awareness, improved throughput and latency, efficient resource allocation, and the enabling of bi-directional communication. Each of these advantages of the distributed SIEM system 110 will now be described in greater detail.

Application-Specific Domain Model.

Conventional centralized SIEM systems are unaware of application-specific domain models. An application such as one of the applications 108 in system 100 generally embodies a specific domain model. This domain model represents the objects and/or concepts that are relevant in the context of that application. A banking application embodies concepts like an "Account Balance," "Customer," "Funds Transfer," etc. A life sciences application may embody concepts like "chromosome," "DNA sequence," or "base pair," etc. Each of the example use case scenarios above describes a situation in which the detailed criteria necessary to specify the conditions for a "situation of interest" would exist only in the context of the application itself, in terms of the particular domain model. For any application, certain object states and state transitions are considered permitted by policy or otherwise commonly occurring, while others are not permitted by policy, or otherwise categorized as unusual or a cause for concern. Defining the state or situation that constitutes such an "alert" must be done in the semantics of the domain model of the application.

It is impossible or highly impractical for activity related to application-specific domain model concepts like this to be managed by a conventional centralized SIEM system. By its nature, the conventional SIEM system is expected to collect log activity from any and all sources. As a result, it is specifically designed to be independent of any specific applications and thus cannot be relied upon to describe any application-specific states. The management model embodied in the conventional SIEM systems is necessarily limited to application-independent concepts such as host computer systems, network devices, communication sessions, and user logins, etc.

Using the injection techniques of the present invention allows the implementation of application-specific correlation rules. That is, the correlation rules represent particular relationships between application-specific domain model objects, and/or particular state transitions of those application-specific domain model objects. The information required to monitor the states and the state transitions of the application objects is available only within the context of the running application. This dynamic, application-specific context cannot be transmitted to the SIEM system, and if transmitted could not be appropriately represented there. Instead, in embodiments of the present invention, the conditions that constitute a situation of interest are described in program code that is injected into the application itself as supplementary processing instructions. These instructions can be created for the benefit of the SIEM system and can perform the domain model-specific monitoring, without otherwise altering the user visible behavior of the application. The function of that supplementary program code could be to identify the situation(s) of interest, and raise an alert to the centralized portion 110A of the distributed SIEM system 110. The expression or representation of the resulting alert can be judiciously chosen to be compatible with an existing SIEM infrastructure that is otherwise unaware of the application-specific injected code.

Situational Awareness.

In the absence of the SIEM injection techniques described herein, each individual application will exhibit a lack of situational awareness. An application will typically be designed to implement authorization policy checks against some trusted security or application-specific policy database. That database may be centralized or it may be local to the application. The rules contained in the policy database constitute the authorization matrix for the user(s) of the application(s). Those skilled in the art will recognize that there are a variety of implementation options available for such an access control subsystem. However, this access control capability will be designed to evaluate the authorization of individual application-specific functions and transactions. The authorization system is not designed to monitor or make authorization decisions for one application based on activity occurring in other applications. Further, application authorization decisions for one user do not take into account the activities performed by another user. This represents a lack of situational awareness.

By way of example, consider the above-described use case involving a series of transactions in which many different users are logging in and doing the same specific application action, such as transferring funds out of their account. Each of these actions is individually allowed by the application policy as adjudicated by an authorization authority. Individually, these transactions do not necessarily represent a SIEM policy violation or any cause for alarm. However, in the aggregate, across all users of the application or across many such applications, this type of activity is understood as unusual to see, and justifies a response from the SOC 102. By introducing a new correlation function that is locally injected into the application as a remote SIEM component, this pattern of activity and others like it can be identified and reported. In addition, an appropriate response can also be effected within the monitored applications, facilitated by the bi-directional communication described below.

Situational awareness is further enhanced in the illustrative embodiments by configuring the remote portions 110B of the distributed SIEM system to reach across various layers of the application stack, including the data layer, messaging, network, and even the management systems that control and monitor the application. While in the distributed approach, the injected SIEM functionality can query application-specific databases, message queues and other component states, a centralized SIEM system can only look broadly at what was logged at a previous point in time by those other layers of the application stack. Unlike the conventional centralized approach, the distributed SIEM approach described herein allows the SIEM system to see more of the details that would otherwise be available only to the applications, and it will therefore have application-specific context to properly filter by not only application instance but also individual transactions within the application.

Throughput and Latency.

There is a mismatch between the throughput and latency of a conventional SIEM system and the throughput and latency requirements of the applications being monitored. This problem is exacerbated at cloud scales. Transmitting the log information from the applications to the centralized SIEM system introduces unavoidable network communication and propagation delays. Once the log information has been collected, it is then necessary to perform the required correlations. In the traditional approach to performing correlations in a centralized SIEM system, the storage and computational resources of the SIEM system are shared. One or more systems are dedicated to performing the SIEM correlation tasks, and these systems represent a pool of shared resources, to be utilized for a variety of SIEM processing tasks such as performing correlations for any number of different situations of interest or attack patterns, across all applications and event sources.

As the scope of SIEM monitoring grows to cover more applications and devices, the share of SIEM computational resources available for monitoring any specific application(s) will necessarily be reduced. This will result in longer computational latency for any specific task. In addition, since these application-specific events will be combined with many other events from many other applications, performing the desired correlations will require significantly more computational resources than if the correlations could be delegated to the system(s) hosting the application in the first place. If the intent of the correlation is to identify situations that should be prevented, then the end user application transaction must be held until the correlation processing has been completed. If the intent of the correlation is to identify situations that require some specific additional response from the SOC, then that response will necessarily be delayed since the correlation task in question is sharing computational resources with many other (possibly unrelated) SIEM tasks.

Had this correlation been performed locally within the application, the network communication and propagation delays could be avoided, and the necessary storage and computational resources could be scheduled (synchronously or asynchronously) within the context of the individual application itself, independent of the load present on the rest of the SIEM system. Finally, the distribution of the SIEM functions to be injected in the applications and associated processing devices themselves means that the overall distributed SIEM system will be able to achieve far greater scalability, as work that was traditionally being done in one central place can now be distributed to additional systems.

Resource Allocation.

There are limitations in dynamically managing the computational resource allocations in a conventional centralized SIEM system. Attempting to perform application-level correlations centrally at cloud scale further exacerbates this problem. Delegating the application-related correlation tasks to the application via SIEM injection as disclosed herein ensures that the resource allocation available for a correlation task is scaled, commensurate with the application itself. As discussed previously, a traditional SIEM system performs correlation tasks in a shared resource pool. The SIEM system is unable to dynamically adjust the prioritization of tasks being performed in the central system based on the activity occurring at an individual application. If the required SIEM components for any application are injected into the application itself, this ensures that when more processing capacity is added to the application, additional processing capacity is added to the corresponding SIEM correlation function.

Enabling Bi-Directional Communication.

The conventional SIEM systems do not enable bi-directional communication of data or control information, such as log information, alerts or events, between the SIEM system and the monitored application, or directly amongst the monitored devices and applications. Rather, the traditional SIEM system collects log data inbound, and raises outbound alerts only to the SOC. There is no provision to communicate information outbound to the monitored application or device in order to statically or dynamically alter the application processing based upon a result computed by the SIEM system.

In the traditional approach, the logs that are created by an application are transported to the SIEM system over a communication network, where they are then processed for the purpose of proving compliance with applicable regulations and for identifying security-relevant events that need to be reported to SOC staff. The flow of SIEM monitoring information is essentially one way, from the applications to the SIEM system. The application being monitored is essentially a passive participant, and is oblivious to the activity of the SIEM system. The processing results that are generated by the traditional SIEM system cannot be communicated back to, or otherwise made available to the applications or associated devices that generated the log information that ultimately caused the alert.

By injecting the application to be monitored with dedicated SIEM-related functions as disclosed herein, a number of communication improvements are achieved. First, when correlations are performed locally by one or more injected SIEM components, the results of the monitoring and correlations can be immediately used to effect changes in the subsequent application processing. For example, if a situation such as one of the use cases above has been identified by the locally injected SIEM correlation, then additional security protections may be dynamically enabled, such as disabling selected application functions or temporarily locking user accounts, etc.

Second, information concerning activity that has been observed in one or more applications or from any other SIEM correlations performed across the deployment can be communicated back to any SIEM-aware application. This enables the SIEM-injected application to benefit from SIEM-related information that is known elsewhere in the network. Thus, it is possible to implement bi-directional flows of both data and control information amongst SIEM-injected applications and their associated processing devices.

Examples of control information would include indicating that the SIEM system has identified a specific network address as being associated with a bad actor, or that certain user accounts have been locked due to nefarious activity elsewhere. This closed-loop feedback could enable the policy or configuration changes to be made to the application, via the injected SIEM components. Rather than participating passively, the application can actively participate in the distributed SIEM system.

Also, correlation results information can be communicated from a specific application to another participant in the SIEM system to enable additional, more global correlations. In other words, the correlation performed at an SIEM-injected application can be considered an intermediate or preliminary result, and this can be communicated to other participants for further processing. This may involve, for example, dynamically adjusting application technical configuration (e.g., close a port, allocate more space on disk, etc.) or changing the behavior of the injected code itself.

The above-described advantages are exemplary only, and need not apply in every embodiment of the invention. However, as is apparent from the foregoing, the distributed SIEM system 110 in one or more embodiments exhibits better scalability, lower latency, improved situational awareness, reduced reaction time for a SOC, and enables correlations across selected applications, independently of whether these were deployed within a single virtual data center (VDC) or across disparate VDCs.

The necessary injections could be done with the original application developer's knowledge, or can be inserted later in the lifecycle, so that monitoring and surveillance can be achieved without the participation of the application deployer. Furthermore, as indicated above, these injections can be done using a standardized syntax and semantics, such as that defined by the OASIS XACML standards. The same Obligations may also be used as a means to turn any application into a source of user and application service intelligence. Messages of interest can be published to authorized subscribers, who can make use of the monitoring stream for any purpose, independent of any SIEM in an enterprise SOC.

Solving this problem locally allows tapping into many more data sources than just logs, allows building of local context more rapidly, and pushing of the more coarse-grained results up to the centralized portion of the SIEM system, allowing it to scale. The disclosed injection techniques can not only benefit from greater situational awareness as described above but can also reach through other layers of the virtualized software stack for additional correlation capabilities.

Furthermore, the distributed SIEM 110 allows for an entirely new kind of autonomous SIEM functionality, done uniquely at an application level, and provides an SIEM solution whose architecture is more natively suited to cloud processing.

As indicated previously, functionality such as that described in conjunction with the diagrams of FIGS. 3 through 11 can be implemented at least in part in the form of one or more software programs stored in memory and executed by a processor of a processing device such as a computer or server. A memory having such program code embodied therein is an example of what is more generally referred to herein as a "computer program product."

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and information technology infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
at least a first processing device comprising a processor coupled to a memory and implementing a given application comprising one or more remote components of a remote portion of a distributed security information and event management (SIEM) system, at least a subset of the remote components of the remote portion of the distributed SIEM system being configured for interaction with a centralized portion of the distributed SIEM system implemented on at least a second processing device distinct from the first processing device;
at least one of the remote components of the remote portion of the distributed SIEM system being configured:
to specify one or more reporting conditions, the one or more reporting conditions comprising allowable conditions within the given application that would not otherwise trigger generation of alerts in the distributed SIEM system absent specification of the one or more reporting conditions;
to perform one or more local correlations of allowable application-specific transactions utilizing information locally accessible within the given application responsive to detecting one or more of the reporting conditions and utilizing results of one or more local correlations performed by one or more additional ones of the remote components of the remote portion of the distributed SIEM system, the results of the one or more local correlations performed by the one or more additional remote components providing situational awareness for authorization policy checks specific to the given application to take into account activity occurring in one or more additional applications;
to deliver results of the one or more local correlations from the remote portion of the distributed SIEM system to the centralized portion of the distributed SIEM system; and
to dynamically alter processing within the given application based at least in part on (i) the results of the one or more local correlations performed by said at least one remote component for the given application and (ii) the results of the one or more local correlations performed by at least one of the additional remote components for at least one of the additional applications;
wherein the at least one remote component is configured to perform the one or more local correlations utilizing an application-specific domain model comprising application-specific objects and application-specific object state transitions relevant in the context of the given application but not represented in application-independent activity logs of the given application sent to the centralized portion of the distributed SIEM system;
wherein the application specific domain model represents conditions within the context of the given application defined using semantics of the given application; and
wherein the at least one remote component is configured to perform the one or more local correlations utilizing correlation rules representing particular relationships between the application-specific objects and particular application-specific object state transitions.

2. The apparatus of claim 1 wherein the at least one remote component is configured to specify the one or more reporting conditions by injecting SIEM code directly into the given application such that when an application request is processed one or more application-specific parts of a context of the application request are made accessible to the at least one remote component for performing the one or more local correlations.

3. The apparatus of claim 2 wherein the at least one remote component is configured to specify the one or more reporting conditions by injecting the SIEM code to assess a current state of the given application before the given application transitions to a new state.

4. The apparatus of claim 2 wherein the at least one remote component is configured to specify the one or more reporting conditions by injecting the SIEM code to assess a current state of the given application in conjunction with one or more authorization checks performed by the given application.

5. The apparatus of claim 4 wherein the at least one remote component is configured to specify the one or more reporting conditions by providing an extension of the one or more authorization checks of the given application, the one or more reporting conditions augmenting the one or more authorization checks of the given application with additional code that must be executed in conjunction with an application request as a condition of allowing the application request to be performed.

6. The apparatus of claim 5 wherein the at least one remote component is configured to specify the one or more reporting conditions utilizing one or more eXtensible Access Control Markup Language (XACML) Obligations.

7. The apparatus of claim 1 wherein the at least one remote component is configured for interaction with one or more other remote components of the remote portion of the distributed SIEM system implemented in the one or more additional applications.

8. The apparatus of claim 1 wherein the at least one remote component is configured for interaction with one or more other remote components of the remote portion of the distributed SIEM system implemented in the given application.

9. The apparatus of claim 1 wherein the at least one remote component is configured to deliver the results of the one or more local correlations by sending an output message to the centralized portion of the distributed SIEM system.

10. The apparatus of claim 9 wherein sending the output message to the centralized portion of the distributed SIEM system comprises at least one of:
propagating an alert to one or more other remote components of the distributed SIEM system;
establishing one or more new correlation rules for use in performing at least one of local correlations at remote components of the remote portion of the distributed SIEM system and global correlations at the central portion of the distributed SIEM system; and
amending definition of one or more alerts in the distributed SIEM system.

11. The apparatus of claim 9 wherein the output message comprises an out-of-band message delivered asynchronously with logs of the given application.

12. The apparatus of claim 1 wherein the at least one remote component is further configured to dynamically alter the processing within the given application without requiring communication with the centralized portion of the distributed SIEM system.

13. The apparatus of claim 1 wherein the one or more remote components of the remote portion of the distributed SIEM system are configured to implement bi-directional flows of data and control information with one another without requiring communication with the centralized portion of the distributed SIEM system.

14. An information processing system comprising the apparatus of claim 1.

15. The information processing system of claim 14, further comprising:
information technology infrastructure including the first processing device providing at least one runtime for a plurality of applications including the given application, the plurality of applications implementing respective remote portions of the distributed SIEM system; and
a security operations center coupled to the information technology infrastructure, the security operations center including the second processing device providing the centralized portion of the distributed SIEM system and an associated database for storing event data generated based on interactions between the centralized portion and the remote portions of the distributed SIEM system.

16. A method comprising:
providing a given application comprising one or more remote components of a remote portion of a distributed security information and event management (SIEM) system;
configuring at least a subset of the remote components of the remote portion of the distributed SIEM system for interaction for a centralized portion of the distributed SIEM system;
specifying, utilizing at least one of the remote components of the remote portion of the distributed SIEM system, one or more reporting conditions, the one or more reporting conditions comprising allowable conditions within the given application that would not otherwise trigger generation of alerts in the distributed SIEM system absent specification of the one or more reporting conditions;
performing, utilizing the at least one remote component, one or more local correlations of allowable application-specific transactions utilizing information locally accessible within the given application responsive to detecting one or more of the reporting conditions and utilizing results of one or more local correlations performed by one or more additional ones of the remote components of the remote portion of the distributed SIEM system, the results of the one or more local correlations performed by the one or more additional remote components providing situational awareness for authorization policy checks specific to the given application to take into account activity occurring in one or more additional applications;
delivering results of the one or more local correlations from the remote portion of the distributed SIEM system to the centralized portion of the distributed SIEM system; and
dynamically altering processing within the given application based at least in part on (i) the results of the one or more local correlations performed by said at least one remote component for the given application and (ii) the results of the one or more local correlations performed by at least one of the additional remote components for at least one of the additional applications;
wherein the given application is implemented utilizing at least a first processing device comprising a processor coupled to a memory, and centralized portion of the distributed SIEM system is implemented utilizing at least a second processing device;
wherein the at least one remote component is configured to perform the one or more local correlations utilizing an application-specific domain model comprising application-specific objects and application-specific object state transitions relevant in the context of the given application but not represented in application-independent activity logs of the given application sent to the centralized portion of the distributed SIEM system;
wherein the application specific domain model represents conditions within the context of the given application defined using semantics of the given application; and
wherein the at least one remote component is configured to perform the one or more local correlations utilizing correlation rules representing particular relationships between the application-specific objects and particular application-specific object state transitions.

17. The method of claim 16 wherein specifying the one or more reporting conditions comprises injecting SIEM code directly into the given application such that when an application request is processed one or more application-specific parts of a context of the application request are made accessible to the at least one remote component for performing the one or more local correlations.

18. A computer program product comprising a non-transitory processor-readable storage medium having encoded therein executable code of one or more software programs, wherein the one or more software programs when executed by a first processing device cause the first processing device:
to provide a given application comprising one or more remote components of a remote portion of a distributed security information and event management (SIEM) system;
to configure at least a subset of the remote components of the remote portion of the distributed SIEM system for interaction for a centralized portion of the distributed SIEM system implemented utilizing a second processing device;
to specify, utilizing at least one of the remote components of the remote portion of the distributed SIEM system, one or more reporting conditions, the one or more reporting conditions comprising allowable conditions within the given application that would not otherwise trigger generation of alerts in the distributed SIEM system absent specification of the one or more reporting conditions;
to perform, utilizing the at least one remote component, one or more local correlations of allowable application-specific transactions utilizing information locally accessible within the given application responsive to detecting one or more of the reporting conditions and utilizing results of one or more local correlations performed by one or more additional ones of the remote components of the remote portion of the distributed SIEM system, the results of the one or more local correlations performed by the one or more additional remote components providing situational awareness for authorization policy checks specific to the given application to take into account activity occurring in one or more additional applications;

to deliver results of the one or more local correlations from the remote portion of the distributed SIEM system to the centralized portion of the distributed SIEM system; and to dynamically alter processing within the given application based at least in part on (i) the results of the one or more local correlations performed by said at least one remote component for the given application and (ii) the results of the one or more local correlations performed by at least one of the additional remote components for at least one of the additional applications;

wherein the at least one remote component is configured to perform the one or more local correlations utilizing an application-specific domain model comprising application-specific objects and application-specific object state transitions relevant in the context of the given application but not represented in application-independent activity logs of the given application sent to the centralized portion of the distributed SIEM system;

wherein the application specific domain model represents conditions within the context of the given application defined using semantics of the given application; and wherein the at least one remote component is configured to perform the one or more local correlations utilizing correlation rules representing particular relationships between the application-specific objects and particular application-specific object state transitions.

19. The computer program product of claim 18 wherein specifying the one or more reporting conditions comprises injecting SIEM code directly into the given application such that when an application request is processed one or more application-specific parts of a context of the application request are made accessible to the at least one remote component for performing the one or more local correlations.

20. The method of claim 16 wherein delivering the results of the one or more local correlations comprises sending an output message to the centralized portion of the distributed SIEM system to at least one of:

propagate an alert to one or more other remote components of the distributed SIEM system;

establish one or more new correlation rules for use in performing at least one of local correlations at remote components of the remote portion of the distributed SIEM system and global correlations at the central portion of the distributed SIEM system; and amend definition of one or more alerts in the distributed SIEM system.

21. The computer program product of claim 18 wherein delivering the results of the one or more local correlations comprises sending an output message to the centralized portion of the distributed SIEM system to at least one of:

propagate an alert to one or more other remote components of the distributed SIEM system;

establish one or more new correlation rules for use in performing at least one of local correlations at remote components of the remote portion of the distributed SIEM system and global correlations at the central portion of the distributed SIEM system; and amend definition of one or more alerts in the distributed SIEM system.

* * * * *